United States Patent

[11] 3,612,434

[72] Inventor Richard M. Johnson
Dallas, Tex.

[21] Appl. No. 15,581
[22] Filed Mar. 2, 1970
[45] Patented Oct. 12, 1971
[73] Assignee International Computer Products, Inc.
Addison, Tex.

[54] TAPE UNIT DRIVE MECHANISM
14 Claims, 10 Drawing Figs.

[52] U.S. Cl. .......... 242/204, 274/11
[51] Int. Cl. .......... B11b 15/32, G03b 1/04
[50] Field of Search .......... 242/197–200, 201, 203, 204, 188–190; 274/4, 11

[56] References Cited
UNITED STATES PATENTS

| | | | |
|---|---|---|---|
| 2,687,259 | 8/1954 | Owens .......... | 242/198 |
| 2,920,148 | 1/1960 | Munroe .......... | 179/100.2 |
| 3,087,686 | 4/1963 | Wren .......... | 242/198 |
| 3,471,104 | 10/1969 | Wakabayashi .......... | 242/201 |
| 3,497,157 | 2/1970 | Hanes et al. .......... | 242/188 |

*Primary Examiner*—Leonard D. Christian
*Attorney*—Giles C. Clegg, Jr.

ABSTRACT: A tape unit for cassette-loaded magnetic tape includes a pair of drive wheels including projecting spindles for driving engagement with the cassette spools. The spindles are braked by a brake member which frictionally engages the drive wheels. Drive shafts, for selective driving engagement with the drive wheels, are rotatably mounted on a pivot frame which also supports the respective drive motors. Solenoid plungers selectively rock the pivot frame to engage one or the other of the drive shafts with a respective drive wheel; and cam means associated with the pivot frame disengage the brake in either drive position.

INVENTOR
RICHARD M. JOHNSON
ATTORNEY

INVENTOR
RICHARD M. JOHNSON
Giles C. Clegg Jr.
ATTORNEY

INVENTOR
RICHARD M. JOHNSON

ATTORNEY

INVENTOR
RICHARD M. JOHNSON

ATTORNEY

TAPE UNIT DRIVE MECHANISM

BACKGROUND OF THE INVENTION

This invention relates to a driving and braking mechanism for a tape unit for the handling of cassette-loaded magnetic tape, wherein the drive of the tape past the read-write head is provided directly through the spools of the cassette. In units of this type, it is desirable that the tape be held tautly between the two spools of the cassette; that is spillage of the tape should not be permitted such as would occur if the supply spool is permitted to rotate through its own momentum after the takeup spool is braked. Such spillage is undesirable for a number of reasons. Spillage may well result in inaccuracies in the information either being written-on or read-from the tape at times of transition from a slack condition to a taut condition. Where such tape units are used as computer interface equipment, it is particularly important that the tape be stopped and started at precise locations of the tape relative to the read-write head in order to accomplish the accurate processing of the data which is either being written-on or read-from the tape. It is particularly important then that the braking arrangement for stopping rotation of the cassette spools, when the drive for the takeup spool is halted, be such that the spools be braked simultaneously or that the braking of the supply spool be effected ahead of the braking of the takeup spool.

An object of this invention is to provide a tape unit including an improved mechanism for braking a pair of tape spools.

Another object of this invention is to provide a cassette tape unit including an improved mechanism for braking both of a pair of tape spools with the braking action favoring the supply spool.

A further object of this invention is to provide a cassette tape unit including improved means for engaging the drive spindles with the cassette spools.

A still further object of this invention is to provide a cassette tape unit including an improved driving and braking mechanism for the cassette spools.

In accordance with the invention, a tape unit includes a support frame for mounting a pair of tape spools or reels and for rotatably supporting drive spindles and associated drive wheels for engaging and driving the tape spools. A brake member is urged into braking engagement with the rims of both drive wheels. A pivot frame, rotatably mounted on the support frame, carries a pair of drive shafts for selective alternative engagement with the respective drive wheels and cam means for disengaging the brake when rocked to a drive position. The pivot frame is normally positioned by the brake-biasing means in a nondriving position.

DRAWINGS

The novel features of the invention as well as additional objects and advantages thereof will be understood more fully from the following description when read in connection with the accompanying drawings in which.

DESCRIPTION OF THE PREFERRED EMBODIMENTS

Figure 1:
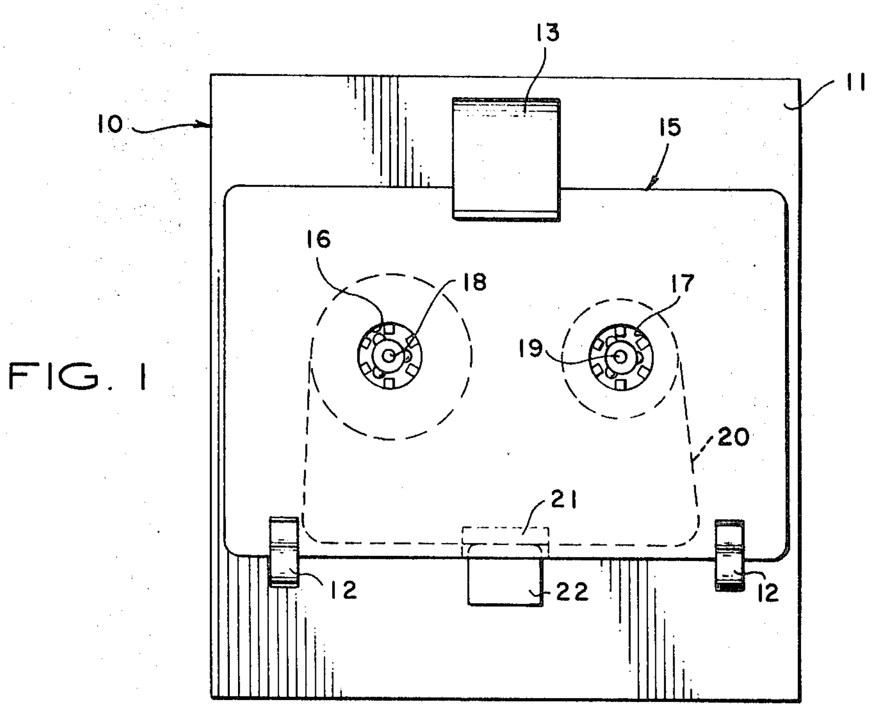
FIG. 1 is a front elevation view of a tape unit or module with a tape cassette mounted thereon.

FIG. 1 is referred to as a front elevation view of a "tape unit", which might also be described as a "tape module" or a "tape transport"; and this unit may be mounted in a cabinet containing other similar tape units or other apparatus associated with a computer for example. As shown in FIG. 1, this unit includes a front plate 11 which is an integral part of the support frame 10, to be described more fully and upon which the other elements of the unit are mounted. The front face of the front plate may have a suitable cover plate for appearance purposes.

A tape cassette 15, shown mounted on the front plate by means of lower brackets 12 and an upper spring clip 13, for example, is a cassette of standard configuration for the handling of one-eighth in. magnetic tape. This cassette has external physical dimensions of approximately 4 in. × 2½ in. × 3/8 in. The cassette includes two tape spools 16 and 17 which are rotatably mounted about spaced openings extending through the cassette, with the spools having openings provided with six radially inward directed teeth for driving engagement with respective hubs of drive spindles 18 and 19.

The path of the tape through the cassette is indicated by the dotted line 20, this path passing adjacent to the lower edge of the cassette and through a frontal recess 21 which accommodates a portion of the read-write head 22 mounted on the front plate 11 whereby the tape passing through the recess engages the head.

Figure 2:
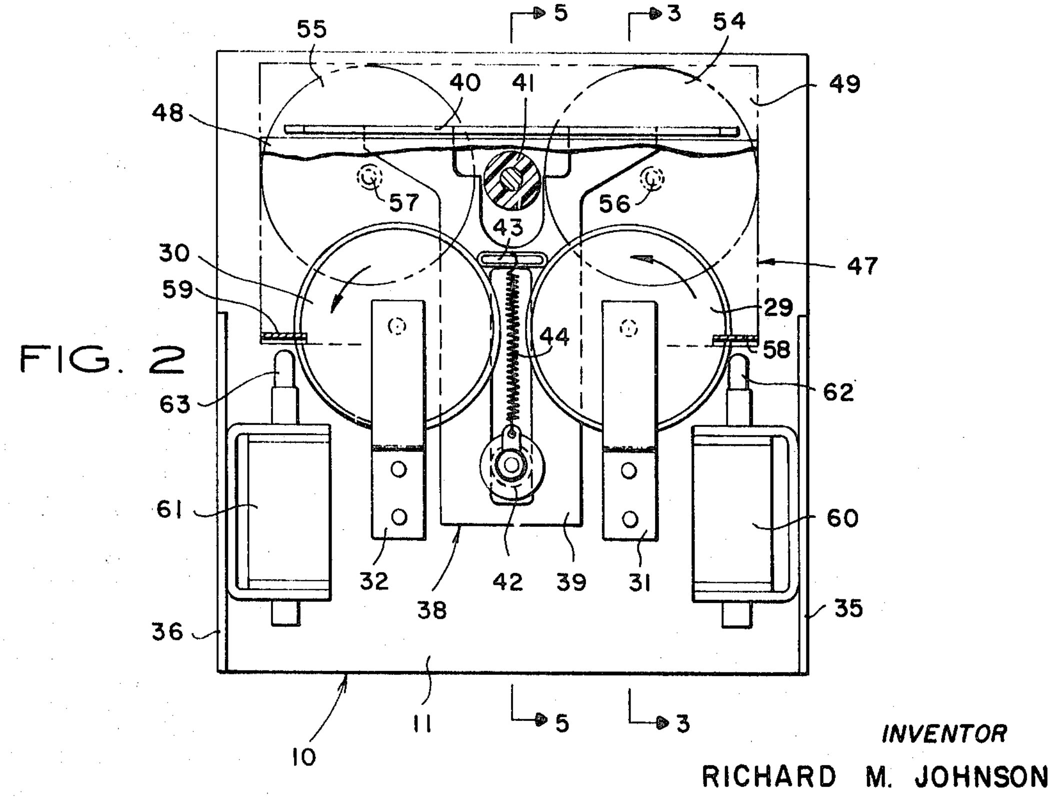
FIG. 2 is a rear elevation view of a tape unit as shown in FIG. 1, illustrating one embodiment of the invention.
Figure 3:
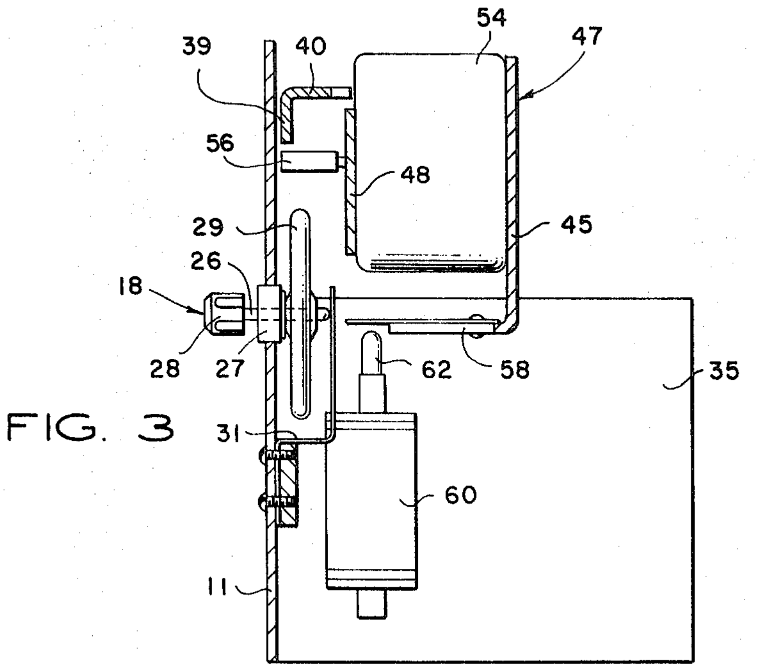
FIG. 3 is a sectional view taken along the Line 3—3 of FIG. 2.
Figures 4, 5:
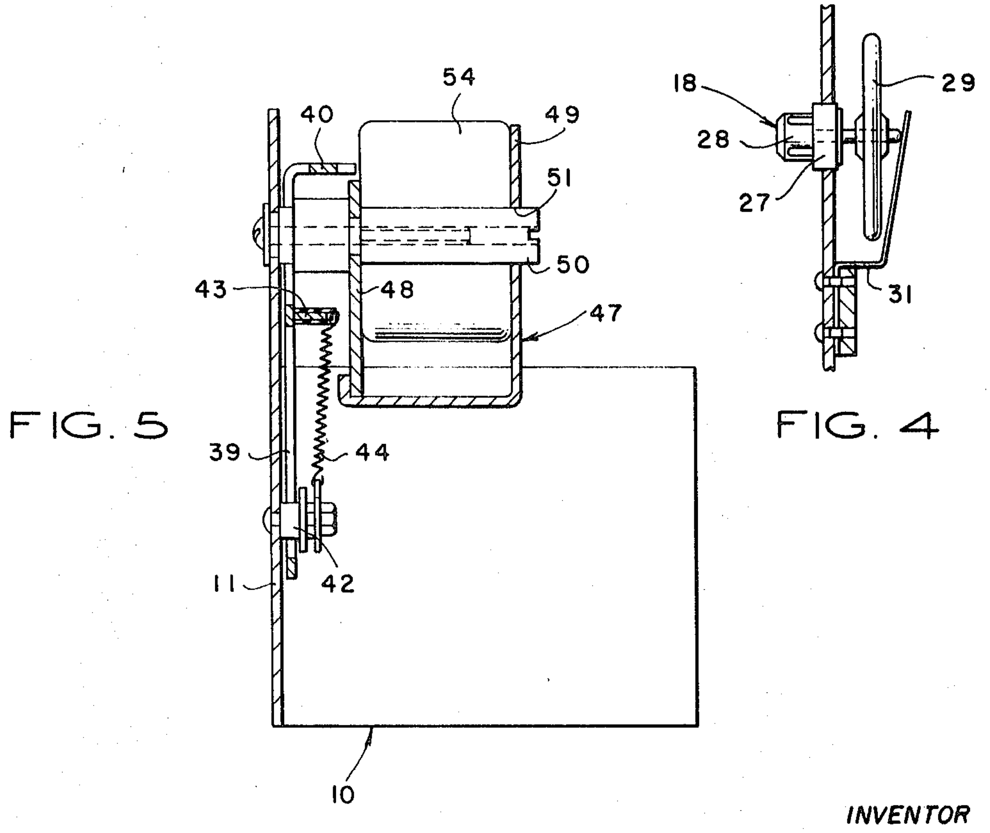
FIG. 4 is a fragmentary view based on FIG. 3.
FIG. 5 is a sectional view taken along the Line 5—5 of FIG. 2.

FIGS. 2, 3, 4 and 5 illustrate a preferred form of driving and braking mechanism according to the invention. The structure of the two drive spindles 18 and 19 for the unit is identical, and the structure of the spindle 18 is best shown in FIGS. 3 and 4. This structure includes a shaft 26 which extends through the front plate 11 to be rotatably supported in a bushing 27. A hub 28 is rigidly fixed to the outer end of the shaft, this hub being provided with three radially spaced axially elongated splines or teeth. As indicated in connection with FIG. 1, the hub 28 is dimensioned to be received within the central aperture of the cassette spool 16 for driving engagement with the teeth of this spool. A drive wheel 29 is fixed to the inner end of the shaft 26 and is provided with a peripheral groove for accommodating a form of tire such as a rubber O-ring.

As seen in FIG. 3, the shaft 26 protrudes slightly rearward from the drive wheel 29; and the inner end of the shaft is engaged by a spring element 31 which is fixed to the front plate 11. As shown in FIG. 3, the drive wheel 29 is urged against the bushing 27 by the spring element 31; and a clearance space is provided between the front face of the bushing 27 and the spindle hub 28. This clearance space permits the axial movement of the shaft 26 relative to the bushing; which movement is permitted by the spring element 31 as indicated in FIG. 4. This relative movement of the spindle assembly 18 is provided to facilitate the mounting of the tape cassette 15 on the front plate 11. Should the splines of the spindle hub 28 and the teeth of the mating cassette spool 16 not be precisely rotationally aligned, the spindle assembly will yield axially as indicated in FIG. 4 to permit the proper positioning of the cassette. As soon as relative rotation occurs between the spindle assembly and the spool, the splines and teeth will become aligned and the spindle assembly will be urged outwardly to position the hub in driving engagement with the cassette spool.

FIG. 2 is an overall elevation view of the rear side of the support frame 10 including the front plate 11 and side plates 35 and 36. In this view there are shown two drive wheels 29 and 30, which are elements respectively of the spindle assemblies 18 and 19, and spring assemblies 31 and 32 for urging the spindle assemblies 18 and 19 respectively to the forward position.

The brake assembly includes an actuator plate 38, which is generally T-shaped in configuration including an upright plate portion 39 mounted against the rear face of the front plate 11 and an upper transverse lip portion 40. The upright plate portion 39 is provided with upper and lower slots which receive guide bushings 41 and 42 respectively which support and guide the brake actuator 38 for vertical reciprocating movement relative to the front plate 11. The brake member is an arm 43 which extends rearwardly from the plate 39 intersecting the plane of the drive wheels 29 and 30. The arm 43 may be enclosed by a sleeve of rubber-like material for engagement with the tires of the drive wheels. As best seen in FIG. 2 the brake arm is disposed between the axis of the drive wheels and is sufficiently wide to engage the rims of the wheels in wedging relation when urged downwardly. As best seen in FIGS. 2 and 5, the brake arm and actuator plate 38 are continuously urged downwardly by a spring 44 connected between the brake arm 43 and the lower guide bushing 42. As best seen in FIG. 2, the portion of the upper guide bushing 41 which extends through the upper slot of the actuator plate 38 has a diameter somewhat smaller than the width of the slot to permit limited lateral movement of the brake arm 43 to be selfcentering relative to the two drive wheels when the brake is applied.

Referring to FIGS. 2, 3 and 5, a pivot frame 47, which carries the drive means for the drive wheels, includes front and rear plates 48 and 49 respectively which are joined together to form an integral assembly. The pivot frame is pivotally mounted on the guide bushing 41 and on a rearwardly extending threaded sleeve 50. As best seen in FIG. 5, the front plate 48 is provided with an aperture which receives a rearwardly extending boss of the bushing 41 to define the pivot axis for the front plate. The threaded sleeve 50 is threaded onto a bolt extending through the front plate 11 and the guide bushing 41, and defines a shoulder retaining the pivot frame front plate on the guide bushing boss. The threaded sleeve 50 extends through an appropriately sized hole 51 in the rear plate 49 to define the pivot axis for the rear plate. This structure also defines the means for mounting the pivot frame 47 to the support frame 10, with the guide bushing 41 determining the space relation between the front plate 11 and the pivot frame 47.

The pivot frame 47, shown partially in phantom lines in FIG. 2 so as not to obscure other portions of the mechanism, supports electrical drive motors 54 and 55 also shown in phantom in FIG. 2. These motors include respective drive shafts 56 and 57 which extend through the pivot frame front plate 48 and are positioned adjacent to the rims of drive wheels 29 and 30 respectively as best seen in FIGS. 2 and 3. In the normal position of the pivot frame, illustrated in FIG. 2, the drive shafts are spaced from the drive wheel rims, but are positioned sufficiently close to the rims so that one or the other of the drive wheel rims is engaged by a shaft when the pivot frame is pivoted or rocked about its first axis from the normal position.

As best seen in FIGS. 2 and 3, the upper horizontal edge of the pivot frame front plate 48 is disposed slightly below the lip portion 40 of the brake actuator 38; and these members are spaced from each other in the above mentioned normal position of the pivot frame. However, when the pivot frame is racked in either direction about its pivot axis, an outer extremity of the front plate 48 will engage an outer extremity of the lip portion 40 to lift the brake actuator 38 and thereby disengage the brake arm 43 from the drive wheels. This release of the brake, then, occurs immediately prior to engagement of one of the motor drive shafts 56 or 57 with a respective drive wheel 29 or 30.

For the purpose of rocking the pivot frame 47, the rear plate 49 is provided with forwardly and horizontally extending arms 58 and 59 each including a spring finger affixed thereto and in a position to be deflected upwardly relative to the respective arm. Solenoid devices 60 and 61 are mounted respectively on the side plates 35 and 36 of the support frame 10 in a manner that the respective solenoid plungers 62 and 63 engage the spring fingers associated with the arms 58 and 59 when the solenoids are energized to extend the plungers in an upward direction.

In operation, the pivot frame is normally maintained in the intermediate position shown in FIG. 2 by the brake actuator 38. The brake actuator is normally urged to the lower braking position shown in FIG. 2 by the spring 44, with the lip portion 40 then confining the pivot frame in a generally horizontal, nondriving position due to the small clearance between the lip 40 and the upper edge of the front plate 48. Assuming that it is desired to drive the spindle assembly 18, whereby the tape will be transported from the supply spool 17 to the takeup spool 16 with reference to FIG. 1, the solenoid 61 will be energized to rock the pivot frame 47 in a clockwise direction as viewed in FIG. 2. The drive motors 54 and 55 may be continuously energized while the unit is in operation, or alternatively the signal which energizes the solenoid 61 may also energize the drive motor 54. Upon rocking of the pivot frame, the drive shaft 56 of the drive motor 54 is urged into engagement with the rim of the spindle drive wheel 29 to rotate this wheel in the direction of the arrow, and the left end of the pivot frame front plate 48 acting as a cam member engages the actuator lip 40 to left the actuator 38 and thereby disengage the brake arm 43 from the rims of the drive wheels 29 and 30 immediately prior to the time that the drive shaft engages the drive wheel. The drive wheel 30 which is coupled to the supply spool 17 also rotates counterclockwise as viewed in FIG. 2.

When it is desired to stop the tape drive, the solenoid 61 is deenergized to permit the pivot frame to return to its intermediate position. This return movement is effected by the brake actuator 38 acting through the spring 44 to move the brake arm 43 into braking engagement with the drive wheels, with the actuator disengaging the motor drive shaft 56 from the drive wheel 29 by rocking the first frame 47 to its intermediate position through the camming action of the lip 40 on the upper edge of the front plate 48.

With reference to the direction of rotation indicated by the arrows, it would appear that the reaction of the drive wheel 29 against the brake arm 43 would tend to reinforce the wedging action of the brake arm 43 provided by the spring 44, while the reaction of the drive wheel 30 would tend to oppose the wedging action. It has been observed, however, that the reaction of the drive wheel 29 is to urge the brake arm laterally in the direction of the drive wheel 30, which has the effect of providing greater braking force to the drive wheel 30. This is desirable since the drive wheel 30, under the assumed conditions, is associated with the supply spool might not be completely braked prior to the complete braking of the takeup spool which would create an undesirable amount of spillage.

Figure 6:
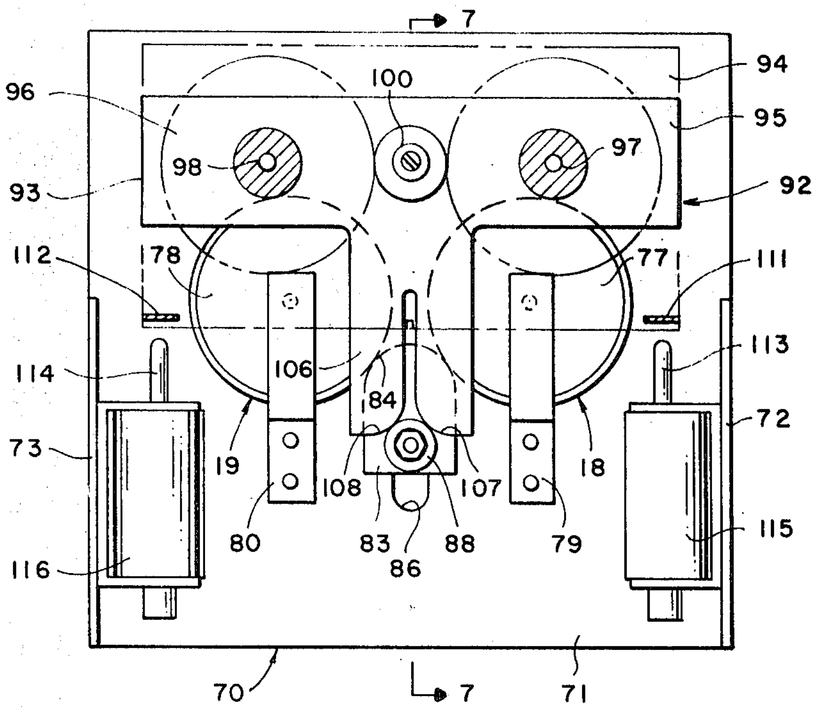
FIG. 6 is a rear elevation view of a tape unit as shown in FIG. 1, illustrating another embodiment of the invention.
Figure 7:
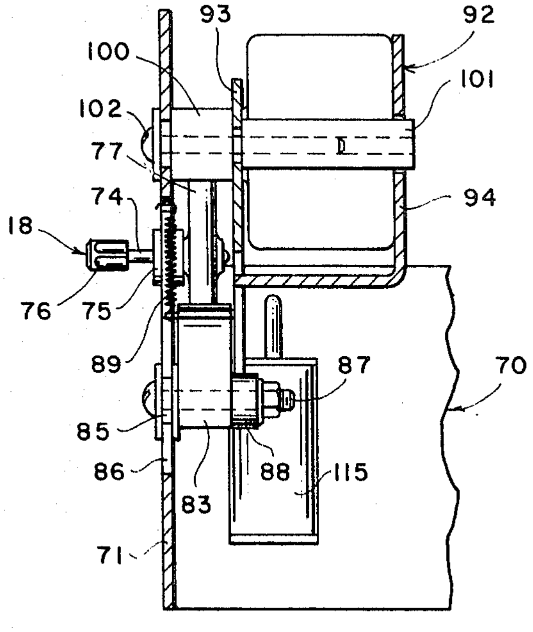
FIG. 7 is a sectional view taken along the line 7—7 of FIG. 6.
Figure 8:
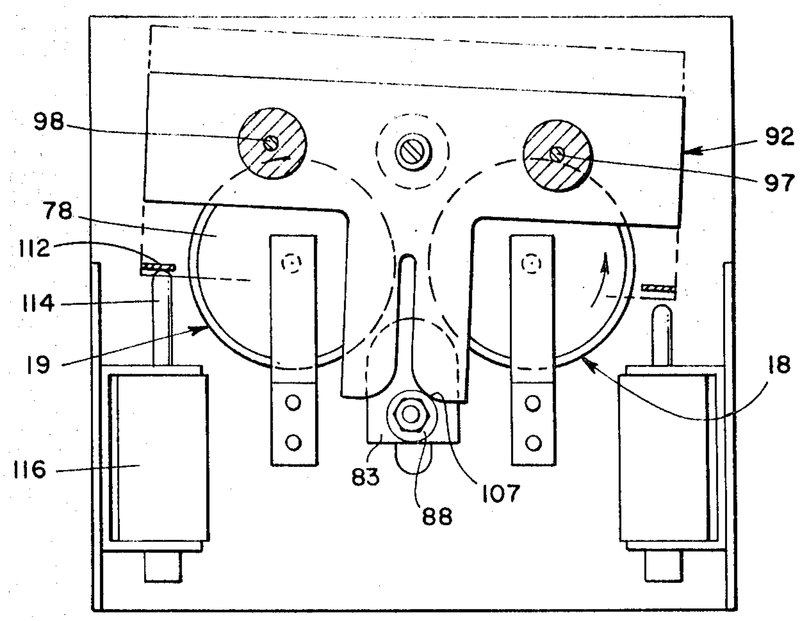
FIG. 8 is a rear elevation view similar to FIG. 5, showing a different operative position.

FIGS. 6, 7 and 8 illustrate an alternative form of driving and braking mechanism according to the invention. A support frame 70 for this embodiment is generally similar in configuration to the support frame 10, including a front plate 71 and side plates 72 and 73.

The structure for the spindle assemblies 18 and 18 is also similar to that described above. The spindle assembly 18, as best shown in FIGS. 6 and 7, includes a shaft 74 rotatably supported in a bushing 75 extending through the front plate 71, with a splined hub 76 fixed to the outer end of the shaft and a drive wheel 77 fixed to the inner end. Referring particularly to FIG. 6, the spindle assemblies 18 and 19 include the drive wheels 77 and 78 respectively; and the spring members 79 and 80 urge the respective spindle assemblies to the outer position, as described previously, in driving relation with the spools 16 and 17 of the cassette.

The braking assembly includes a brake member 83 in the form of a vertically elongated block mounted for vertical reciprocating movement in the plane of the drive wheels 77 and 78, and having an upper cylindrical surface 84 for frictional engagement with the rims of the drive wheels. The brake member is supported and guided for vertical movement relative to the front plate 71 by means of a spool-shaped guide bushing 85, fabricated of a suitable plastic material for example, which is received within a vertical slot 86 in the front plate 71. The guide bushing 85 is assembled to the brake member by means of a bolt and nut for example, with the bolt extending through the bushing and a hole adjacent to the lower end of the brake member 83. With this arrangement, the vertically elongated brake member block is pivotally supported at its lower end, with the upper end bearing the cylindrical brake surface 84 able to swing laterally to center or equalize itself relative to the rims of the drive wheels 77 and 78. An inwardly extending cylindrical boss 88 is provided on the brake member and, as illustrated, the hole for the bolt 87 extends through this boss. The boss 88 defines a cam member for disengaging the brake as will be described. The brake member 83 is normally urged upwardly into braking engagement with the rims of the drive wheels 77 and 78 by means of a spring 89 attached to suitable upper and lower pins mounted on the front plate 71 and the brake member 83 respectively, as best seen in FIG. 7.

Similar to the embodiment of FIGS. 2 to 5, a pivot frame 92 carries the drive means for the drive wheels 77 and 78, and includes front and rear plates 93 and 94 respectively which are joined together to form an integral assembly. This pivot frame supports drive motors 95 and 96, shown in phantom lines in FIG. 6, and respective drive shafts 97 and 98. As best seen in FIG. 7, the pivot frame 92 is pivotally supported on a spacer bushing 100 having forward and rearward bosses, the forward boss being received in an aperture in the front plate 71 to locate the pivot axis relative to the support frame, and the rearward boss being received in an appropriately sized aperture in the front plate 93 of the pivot frame to define the pivot axis for the front plate. A threaded sleeve 101 is threaded onto a bolt 102, extending through the front plate 71 and the spacer sleeve 100, to define a shoulder to retain the pivot frame front plate in pivotal relation with the spacer sleeve 100. The threaded sleeve 101 extends through an appropriately sized hole 103 in the pivot frame rear plate 94 to define the pivot axis for the rear plate. It will be seen then that the assembly of the spacer sleeve 100, threaded sleeve 101, and bolt 102 mount and support the pivot frame 92 in appropriate spaced and pivotal relation relative to the support frame 70.

The pivot frame front plate 93, which is shown in full in FIG. 6, is generally T-shaped including a downwardly extending leg 106 which is forked to define curved cam surfaces 107 and 108 for engagement with the cylindrical boss 88 of the brake member 83. In the normal position of the brake member and of the pivot frame, which is illustrated in FIG. 6, the brake member is maintained in braking engagement with the drive wheels by the spring 89; and the brake member boss 88 acts as a cam coacting with the cam surfaces 107 and 108 of the pivot frame leg to maintain this pivot frame in the indicated normal position. In this position, clearance is provided between the surface of the boss 88 and the cam surfaces 107 and 108 so that the cam surfaces will not prevent the brake member from engaging the drive wheels. However, the boss 88 limits the rocking movement of the pivot frame to maintain the motor drive shafts 97 and 98 out of engagement with the rims of the respective drive wheels 77 and 78. The space relations are such that when the pivot frame is rocked in a clockwise direction, as viewed in FIG. 6, the motor drive shaft 97 will be engaged with the rim of the drive wheel 77, while the brake member 83 is simultaneously disengaged from the drive wheels through the camming action of the pivot-frame cam surface 107 against the brake member boss 88. This condition is illustrated in FIG. 8. Similarly, when the pivot frame is rocked in a counterclockwise direction, the motor drive shaft 98 is engaged with the drive wheel 78, while the brake member 83 is simultaneously disengaged.

The structure for rocking the pivot frame is similar to that described for the embodiment of FIG. 2. The rear plate 94 of the pivot frame is provided with forwardly extending arms and spring finger assemblies 111 and 112 positioned to be engaged by the plungers 113 and 114 of the solenoid devices 115 and 116 respectively. The solenoid devices are supported by appropriate brackets secured to the side plate 72 and 73 respectively of the support frame 70.

In the operation of the embodiments of FIGS. 6 through 8, the brake member 83 is normally urged into braking engagement with the drive wheels by the spring 89, with the boss 88 maintaining the pivot frame 92 in the intermediate position through coaction with the cam surfaces 107 and 108. In this intermediate position of the pivot frame, the drive shafts 97 and 98 of the respective motors 95 and 96 are maintained out of engagement with the respective drive wheels 77 and 78. To drive the tape in the reverse direction, with reference to FIG. 1 wherein the tape is transported from the supply spool 17 to the takeup spool 16, the solenoid 116 is energized to extend its plunger 114 upward to engage the arm assembly 112 of the pivot frame. This rocks the pivot frame clockwise, as viewed in FIG. 6, to the condition illustrated in FIG. 8 wherein the motor drive shaft 97 engages the drive wheel 77 in driving relation, and wherein the brake member 83 is disengaged from both drive wheels 77 and 78. Assuming that the motor 95 is either continuously energized or is energized simultaneously with the solenoid 116, the drive wheel 77 and spindle assembly 18 are driven in a counterclockwise direction, as viewed in FIG. 6, to transport the tape in the direction indicated. To stop the transport of the tape the solenoid 116 is deenergized permitting its plunger 114 to drop. Since the spring 89 is continuously applying a centering force to the pivot frame through the cam surface 107, as soon as the rocking force applied by the solenoid is released, the brake member rocks the pivot frame back to the intermediate position while simultaneously moving upward to frictionally engage the rims of the two drive wheels. Since the brake member is selfcentering relative to the two drive wheels, the drive wheels are braked substantially simultaneously.

Figure 9:
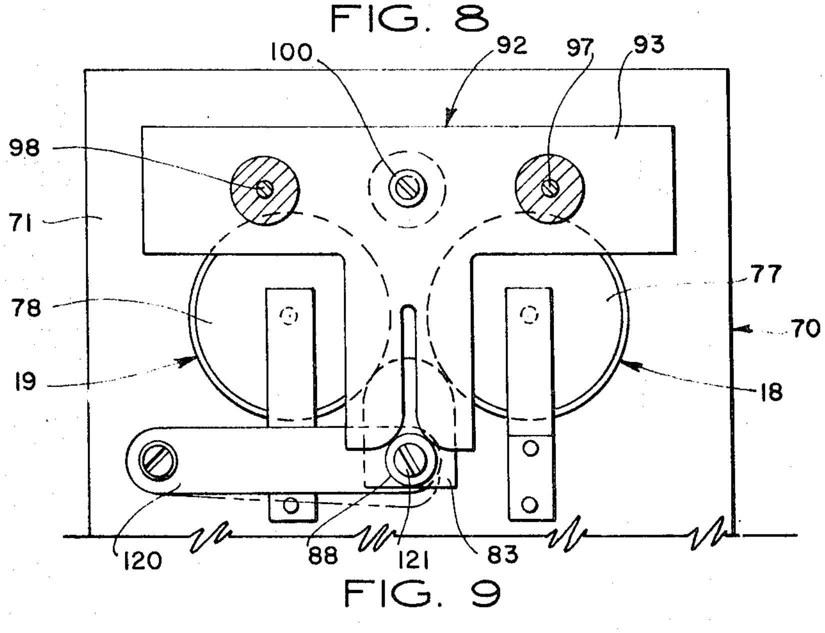
FIG. 9 is a fragmentary view in rear elevation of a portion of the mechanism illustrated in FIG. 5, showing a modification of the mechanism.

FIG. 9 of the drawing illustrates a modified form of structure for the mounting of the brake member 83 in the apparatus of FIGS. 6 through 8. In its modified form, the brake member 83 has an identical configuration, however, it is mounted on the support frame 70 in a different manner. The brake member, rather than being supported and guided in the vertical slot in the support frame front plate is pivotally supported on the end of a laterally extending arm 120 by means of a bolt assembly 121 for example, which extends through an appropriate aperture in the end of the arm 120 and through the transverse hole extending through the lower portion of the brake member block and the boss 88. The other end of the transverse arm 120 is pivotally mounted on the support frame 70, preferably at the front plate 71 thereof at a point laterally spaced from the pivot axis of the brake member. The arm 120 is positioned horizontally so as to be generally perpendicular to the vertical reciprocating movement of the brake member 83 into and out of braking engagement with the drive wheels. With this mounting arrangement, the vertical movement of the brake member is arcuate; however, the length of the arm 120 is sufficiently great relative to the limited vertical excursion required of the brake member 83 so that the brake mechanism will operate in the same manner that is described for the mechanism of FIGS. 6 through 8.

Figure 10:
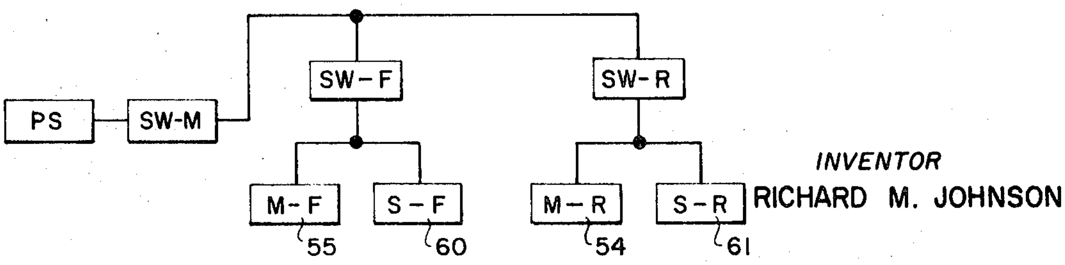
FIG. 10 is a block diagram of a control circuit for the embodiments of either FIGS. 2 or 6.

FIG. 10 is a schematic block diagram of one form of control circuit which may be used with the above described apparatus, this circuit being described with particular reference to the embodiment of FIGS. 2 through 5. With reference to FIG. 1, it is considered that the transport of the tape from the spool 16 onto the spool 17 is a movement in a forward direction, with the spindle assembly 19 driving the takeup spool 17 and the spool 16 then being the supply spool. For transport of the tape in a reverse direction, the spindle assembly 18 would drive the spool 16 as the takeup spool with the spool 17 being the supply spool. Referring to the diagram of FIG. 10, the block PS represents a power supply or source, with the block SW–M representing a main on-off switch for connecting the power source to all of the elements of the apparatus.

To effect transport of the tape in a forward direction, the switch SW–F is closed, this switch closing a circuit to supply energy to the forward drive motor M–F which is the motor 55 in FIG. 2. Simultaneously, the switch SW–F closes a circuit to energize the solenoid S–F which is the solenoid 60 in FIG. 2. The brake is released and the drive wheel 30, of the spindle assembly 19, is then driven by the motor drive shaft 57 to transport the tape in a forward direction. Opening the switch S–F deenergizes the motor and solenoid to stop the drive and brake the spindle assemblies.

To reverse the direction of tape transport, the switch SW–R is closed, this said switch closing a circuit to supply energy to the motor M–R, which is the motor 54 of FIG. 2, and closing a circuit to supply energy to the solenoid S–R which is the solenoid 61 in FIG. 2. The spindle assembly 18 is then driven through a drive wheel 29 to drive the tape spool 16 which becomes the takeup spool.

In an alternative control circuit, the motors M–F and M–R may be energized through the switch SW–M, for example, with the switches SW–F and SW–R only acting to close the circuits for the respective solenoids S–F and S–R.

Although the invention has been described with reference to particular preferred embodiments thereof, many changes and modifications to the apparatus shown will become apparent to those skilled in the art in view of the foregoing description which is intended to be illustrative and not limiting of the invention defined in the appended claims.

What is claimed is:

1. A drive and brake mechanism for a magnetic tape unit comprising:

a support frame; a pair of drive wheels rotatably mounted on said support frame in spaced relation, each having a drive spindle for engaging and driving a tape spool; a brake member mounted on said support frame for movement into and out of braking engagement with the rims of said drive wheels; means normally urging said brake member into braking engagement with the rims of said drive wheels;

a pivot frame pivotally mounted on said support frame about an axis spaced from the axes of said drive wheels; a pair of drive shafts rotatably mounted on said pivot frame and disposed for selective engagement with the rims of respective drive wheels; brake actuator means fixed to said pivot frame for selective engagement with said brake member;

means normally positioning said pivot frame in an intermediate position wherein both of said drive shafts are disengaged from the respective drive wheels;

said pivot frame being rotatable to a first drive position wherein one of said drive shafts engages and rotates one of said drive wheels; said pivot frame being rotatable to a second drive position wherein the other of the said drive shafts engages and rotates the other of said drive wheels; and said brake actuator means engaging said brake member, in both said first and second positions of said pivot frame, to disengage said brake member from said drive wheels.

2. Apparatus as set forth in claim 1 wherein said drive wheels and said brake member are positioned on said support frame that said brake member is normally urged into wedging relation between the rims of said drive wheels.

3. Apparatus as set forth in claim 2 wherein said drive wheels are rotated in the same direction during operation of the device; wherein said brake member is positioned that the inertia of the drive wheel driven by its respective drive spindle and coupled to the takeup spool tends to reinforce the wedging action and wherein the inertia of the following drive wheel, coupled to the supply spool, tends to oppose the wedging action; said driven drive wheel thereby urging said brake member more forcefully against said following drive wheel.

4. Apparatus as set forth in claim 1 mounting plate means for said brake member guided on said support frame for reciprocating movement in a direction perpendicular to the plane of the drive wheel axes; said mounting plate means including cam means;

said pivot frame including cam means defining said brake actuator means; said first frame cam means being disposed in close spaced relation to said brake-mounting plate cam means, to effect the engagement of said brake cam means by said pivot frame cam means when said drive assembly is rotated to engage a drive spindle with a respective drive wheel, said brake-mounting plate being thereby moved to disengage said brake member from said drive wheels.

5. Apparatus as set forth in claim 1 wherein said brake member is mounted for limited lateral movement to effect a full engagement with both of the drive wheels.

6. Apparatus as set forth in claim 1 motor means for driving said drive shafts in opposite directions of rotation.

7. Apparatus as set forth in claim 6 wherein said motor means comprise individual motors mounted on said pivot frame for driving the respective drive shafts.

8. Apparatus as set forth in claim 1 selectively operable means for rotating said pivot frame from said intermediate position alternatively to said first and second drive positions.

9. Apparatus as set forth in claim 8 wherein said selectively operable means include a pair of solenoids mounted on said support frame to selectively engage the pivot frame respectively on opposite sides of the pivot axis.

10. Apparatus as set forth in claim 1 wherein each of said drive spindles includes a splined hub for positive driving engagement with a toothed aperture in the tape spool; said drive spindles being mounted for axial sliding movement relative to said support frame; and spring means urging said spindles to the normal driving position in the plane of the tape spools.

11. Apparatus as set forth in claim 1 including cam means associated with said brake member; and said pivot frame including cam means for coacting engagement with said brake member cam means, said pivot frame cam means defining said brake actuator means.

12. Apparatus as set forth in claim 11 wherein said means urging said brake member into braking engagement with said drive wheels comprises spring means connected between said brake member and said support frame.

13. Apparatus as set forth in claim 11 wherein said means normally positioning said pivot frame in an intermediate position comprises said brake member cam means coacting with said pivot frame cam means.

14. Apparatus as set forth in claim 1 wherein said brake member and said pivot frame include coacting cam means; said pivot frame cam means defining said brake actuator means; and said brake member cam means defining said means normally positioning said pivot frame in an intermediate position.